(12) United States Patent
Chen et al.

(10) Patent No.: US 9,897,077 B2
(45) Date of Patent: Feb. 20, 2018

(54) SOLAR AUTOMATIC HEAT COLLECTING AND EQUALIZING TUBE, AUTOMATIC HEAT EQUALIZING TROUGH-TYPE MODULE, SOLAR-THERMAL COMPLEMENTARY POWER GENERATION SYSTEM COMPRISING THE SAME, AND POWER GENERATION METHOD USING THE SAME

(71) Applicant: ZHONGYING CHANGJIANG INTERNATIONAL NEW ENERGY INVESTMENT CO., LTD., Wuhan (CN)

(72) Inventors: Yilong Chen, Wuhan (CN); Qingping Yang, Wuhan (CN); Yanfeng Zhang, Wuhan (CN)

(73) Assignee: ZHONGYING CHANGJIANG INTERNATIONAL NEW ENERGY INVESTMENT CO., LTD., Wuhan (CN)

( * ) Notice: Subject to any disclaimer, the term of this patent is extended or adjusted under 35 U.S.C. 154(b) by 222 days.

(21) Appl. No.: 14/818,301

(22) Filed: Aug. 4, 2015

(65) Prior Publication Data
US 2015/0337811 A1 Nov. 26, 2015

Related U.S. Application Data

(63) Continuation-in-part of application No. PCT/CN2014/071568, filed on Jan. 27, 2014.

(30) Foreign Application Priority Data

Feb. 5, 2013 (CN) .......................... 2013 1 0045666

(51) Int. Cl.
*F03G 6/06* (2006.01)
*F24J 2/00* (2014.01)
(Continued)

(52) U.S. Cl.
CPC .............. *F03G 6/065* (2013.01); *F22B 1/006* (2013.01); *F22B 33/00* (2013.01); *F24J 2/0007* (2013.01);
(Continued)

(58) Field of Classification Search
CPC .. F24J 2/48; F24J 2/0007; F24J 2/0015; F24J 2/055; F24J 2/266; F24J 2002/261; F24J 2/04; F24J 2/05; F03G 6/065
See application file for complete search history.

(56) References Cited

U.S. PATENT DOCUMENTS 4,092,979 A * 6/1978 Kotlarz ...................... F24J 2/06
126/628
4,122,831 A * 10/1978 Mandjuri ................. F24J 2/055
126/657
(Continued)

FOREIGN PATENT DOCUMENTS

CN 1851350 A * 10/2006 ............... F01K 7/22
CN 101126553 A 2/2008
(Continued)

OTHER PUBLICATIONS

CN 1851350 A English Translation.*
DE10338483A1 English Translation.*

*Primary Examiner* — Mark Laurenzi
*Assistant Examiner* — Shafiq Mian
(74) *Attorney, Agent, or Firm* — Matthias Scholl P.C.; Matthias Scholl

(57) ABSTRACT

A solar automatic heat collecting and equalizing tube, including: a glass tube, an absorption tube, and a baffle. The glass tube is sleeved on the absorption tube. The absorption tube is coated with a heat absorption layer. The space between the glass tube and the absorption tube is vacuum. The baffle is disposed in the inner cavity of the absorption tube and is configured to drive a fluid in the absorption tube (Continued)

to tumble up and down alternately. The baffle is spiral in shape and fixed in the absorption tube.

16 Claims, 5 Drawing Sheets

(51) Int. Cl.
*F24J 2/26* (2006.01)
*F22B 33/00* (2006.01)
*F22B 1/00* (2006.01)
*F24J 2/05* (2006.01)
*F24J 2/07* (2006.01)
*F24J 2/14* (2006.01)
*F24J 2/46* (2006.01)

(52) U.S. Cl.
CPC .............. *F24J 2/0015* (2013.01); *F24J 2/055* (2013.01); *F24J 2/07* (2013.01); *F24J 2/14* (2013.01); *F24J 2/266* (2013.01); *F03G 2006/061* (2013.01); *F24J 2002/261* (2013.01); *F24J 2002/4603* (2013.01); *Y02E 10/41* (2013.01); *Y02E 10/44* (2013.01); *Y02E 10/45* (2013.01); *Y02E 10/46* (2013.01)

(56) References Cited

U.S. PATENT DOCUMENTS

| | | | | |
|---|---|---|---|---|
| 4,283,914 | A | 8/1981 | Allen | |
| 4,554,908 | A * | 11/1985 | Hanlet | F24J 2/0488 126/652 |
| 7,597,136 | B2 * | 10/2009 | Kite | F28D 7/024 165/154 |
| 8,671,932 | B2 * | 3/2014 | Eck | F22B 1/006 126/569 |
| 8,752,542 | B2 * | 6/2014 | O'Donnell | F24J 2/05 126/600 |
| 2011/0137480 | A1 * | 6/2011 | Sampson | G05B 13/021 700/288 |
| 2012/0144831 | A1 * | 6/2012 | Feldhoff | F22B 1/006 60/641.8 |
| 2012/0255300 | A1 * | 10/2012 | Birnbaum | F03G 6/065 60/641.8 |
| 2013/0025587 | A1 * | 1/2013 | Lopez Ferrero | F24J 2/055 126/684 |
| 2013/0091842 | A1 * | 4/2013 | Kaufmann | F01K 13/02 60/641.8 |
| 2013/0219888 | A1 * | 8/2013 | Yang | F01K 7/22 60/641.8 |
| 2013/0219890 | A1 * | 8/2013 | Majima | F24J 2/14 60/641.15 |
| 2013/0276447 | A1 * | 10/2013 | Chaix | F01K 3/186 60/641.15 |
| 2014/0060519 | A1 * | 3/2014 | Bent | F01K 7/22 126/714 |
| 2014/0202155 | A1 * | 7/2014 | Ota | F22B 1/006 60/641.15 |
| 2014/0216032 | A1 * | 8/2014 | Levin | F03G 6/065 60/641.15 |

FOREIGN PATENT DOCUMENTS

| | | | | |
|---|---|---|---|---|
| CN | 101968041 | A * | 2/2011 | ............ F01K 7/22 |
| CN | 103115445 | A | 5/2013 | |
| CN | 203100256 | U | 7/2013 | |
| DE | 10338483 | A1 * | 3/2005 | ............ F24J 2/055 |

* cited by examiner

SOLAR AUTOMATIC HEAT COLLECTING AND EQUALIZING TUBE, AUTOMATIC HEAT EQUALIZING TROUGH-TYPE MODULE, SOLAR-THERMAL COMPLEMENTARY POWER GENERATION SYSTEM COMPRISING THE SAME, AND POWER GENERATION METHOD USING THE SAME

CROSS-REFERENCE TO RELATED APPLICATIONS

This application is a continuation-in-part of International Patent Application No. PCT/CN2014/071568 with an international filing date of Jan. 27, 2014, designating the United States, now pending, and further claims priority benefits to Chinese Patent Application No. 201310045666.4 filed Feb. 5, 2013. The contents of all of the aforementioned applications, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, Cambridge, Mass. 02142.

BACKGROUND OF THE INVENTION

Field of the Invention

The invention relates to the field of solar-thermal power generation, and more particularly to a solar-thermal complementary power generation device/system comprising solar trough thermal collector tubes as well as a power generation method using the same.

Description of the Related Art

Typical trough solar thermal power generation systems employ a turbine to drive the motor and employ water vapor as a working medium. In general, the evacuated solar collector tubes of the trough solar thermal power generation systems employ conduction oil (or melted salt) to collect solar energy, and the heated conduction oil (or melted salt) heats water to produce steam to drive the turbine for power generation. FIG. 1 shows an evacuated solar collector tube module, which includes a parabolic trough reflector $1b1$ and an evacuated solar collector tube disposed at the focal point of the parabolic trough reflector. The evacuated solar collector tube includes a glass tube $1b2$ and an absorption tube $1b3$ coated with a heat absorption layer. The glass tube is sleeved on the absorption tube, and a space between the glass tube $1b2$ and the absorption tube $1b3$ is vacuum.

The above trough solar thermal power generation systems includes at least the following two disadvantages. First, the solar energy is subject to the weather conditions, so it is unstable and discontinuous. The conduction oil (or melted salt) can store thermal energy, thereby offsetting the influence of the weather. Second, the trough solar thermal power generation systems employ evacuated solar collector tubes, which cannot be adapted to the physical properties of water, when water is heated to certain temperatures and pressures by solar energy, the tubes may burst.

That is because the solar energy concentrated by the trough reflector always heats the side of the evacuated solar collector tube close to the parabolic trough reflector $1b1$ (as shown in FIG. 1, the lower part of the glass tube $1b2$), while the opposite side, that is, the upper part of the glass tube in FIG. 1, will never receive concentrated sunlight, and the convergence ratio thereof is 80:1. As a result, the instantaneous temperature difference between the upper and lower part is up to more than 300° C. The space between the glass tube $1b2$ and the absorption tube $1b3$ is vacuum. If the absorption tube $1b3$ is filled with conduction oil (or melted salt), the good heat conductivity of the liquid medium can quickly equalize the temperature of the absorption tube $1b3$, thereby preventing the occurrence of the large temperature difference and the formation of internal stress. If the absorption tube $1b3$ is filled with water, when the water temperature exceeds 100° C., water vapor is produced and floated on the upper part of the horizontally placed long evacuated solar collector tube, and the lower part thereof is liquid water. The heat conductivity difference of the water vapor and the liquid water is huge, which inevitably causes the huge temperature difference of the upper and lower parts of the evacuated solar collector tube, and due to the heat expansion and cold contraction of the tubes, large internal stress is produced, and thus the evacuated solar collector tube tends to burst.

SUMMARY OF THE INVENTION

In view of the above-described problems, it is one objective of the invention to provide a solar automatic heat equalizing and collecting tube and a solar trough type thermal collecting module comprising the same. The solar automatic heat equalizing and collecting tube is adapted to be filled with water directly and do not burst during working. In addition, the invention also provides a solar-thermal complementary power generation system comprising the solar trough type thermal collecting module comprising the solar automatic heat equalizing and collecting tube and a solar-thermal complementary power generation method using the same. The solar-thermal complementary power generation method of the invention is weatherproof and can work sustainedly and steadily at night or cloudy or rainy days, with energy conservation and eco-friendliness.

To achieve the above objective, in accordance with one embodiment of the invention, there is provided a solar automatic heat collecting and equalizing tube, comprising: a glass tube, an absorption tube, and a baffle. The glass tube is sleeved on the absorption tube; the absorption tube is coated with a heat absorption layer; a space between the glass tube and the absorption tube is vacuum; the baffle is disposed in an inner cavity of the absorption tube and is configured to drive a fluid in the absorption tube to tumble up and down alternately; and the baffle is spiral in shape and fixed in the absorption tube.

In a class of this embodiment, the baffle is spirally and continuously distributed in the absorption tube, and axial pitches of the baffle are the same; or the baffle is spirally distributed at intervals in the absorption tube, and the axial pitches in different sections of the baffle are the same; along an axial direction of the absorption tube, one end of the baffle is fixed on the inner cavity of the absorption tube, and the other end of the baffle is free; or the baffle employs a plurality of spiral blades fixed on an axial rod, one end of the spiral blades is fixed on the inner cavity of the absorption tube, and the other end of the spiral blades is free; the spiral blades are uniformly distributed and the pitches thereof are the same.

An automatic heat equalizing trough type module, comprises the solar automatic heat collecting and equalizing tube. The solar automatic heat collecting and equalizing tube is disposed at a focal point of a parabolic trough reflector.

The invention also provides a thermal power generation system, which is a solar-thermal complementary power generation system, the system comprising a solar concentration and heat supply module, a boiler heat supply module, and a turbogenerator unit. The solar concentration and heat supply module comprises a preheating section and a steam-water two phase evaporation section which are connected in series, the preheating section comprises an evacuated solar collector tube, and the steam-water two phase evaporation section comprises the automatic heat equalizing trough type module; at least one steam-water separator is connected in series to an output tube at one end of the steam-water two phase evaporation section; a steam output end of the steam-water separator converges with an output end of a boiler steam drum, and converged steam is transported to the turbogenerator unit via a superheater of the boiler heat supply module; a separated water output end of the steam-water separator is connected to a solar automatic heat collecting and equalizing tube of the automatic heat equalizing trough type module via a backflow pipe; a condenser output end of the turbogenerator unit is connected to a water supply module; the water supply module comprises one water inlet pipe and two water outlet pipes, one water outlet pipe communicates with a first evacuated solar collector tube, and the second water outlet pipe communicates with a boiler water supply pipe.

In a class of this embodiment, a steam output end of a last steam-water separator converges with an output end of the boiler steam drum via a steam valve.

The invention further provides a power generation method using the thermal power generation system, the power generation comprising a solar-thermal complementary power generation mode in sunny days and a boiler heat supply power generation mode at night or cloudy/rainy days, and the method comprising: in sunny days, introducing feedwater provided by a water supply pipe to the solar concentration and heat supply module, preheating the feedwater by solar energy in the evacuated solar collector tube of the preheating section, and then continuing heating the feedwater in the solar automatic heat collecting and equalizing tube of the steam-water two phase evaporation section whereby producing a water-steam two-phase mixing flow in the absorption tube, allowing the mixing flow to tumble spirally in the absorption tube under the action of the baffle to quickly equalize the temperature of the absorption tube, and then introducing the mixing flow to the steam-water separator and separating steam from water; returning the separated water to the steam-water two phase evaporation section for reevaporation, and converging the separated steam with saturated steam from the boiler steam drum, heating mixed steam in a heating module of the boiler to yield superheated steam, and transporting the superheated steam to the turbogenerator unit for solar-thermal complementary power generation;

at night or cloudy/rainy days, introducing the feedwater only to a boiler heating module to produce superheated steam, and transporting the superheated steam via a superheater to the turbogenerator unit for thermal power generation. In the boiler heat supply power generation mode, the solar heating module stops working, and water in the solar automatic heat collecting and equalizing tube stop flowing and stays in the insulating state.

In accordance with another embodiment of the invention, there provided is a thermal power generation system, which is a solar-thermal complementary power generation system, the system comprising a solar concentration and heat supply module, a boiler heat supply module, and a turbogenerator unit. The solar concentration and heat supply module comprises a preheating section, a steam-water two phase evaporation section, and a superheat section which are connected in series, the preheating section comprises an evacuated solar collector tube, and the steam-water two phase evaporation section and the superheat section comprise the automatic heat equalizing trough type module; at least one steam-water separator is connected in series to an output tube at one end of the steam-water two phase evaporation section; a steam output end of the steam-water separator is connected to a solar automatic heat collecting and equalizing tube of a first automatic heat equalizing trough type module of the superheat section, and a last solar automatic heat collecting and equalizing tube of the superheat section is connected to an inlet of the turbogenerator unit; a separated water output end of the steam-water separator is connected to a solar automatic heat collecting and equalizing tube of the automatic heat equalizing trough type module via a backflow pipe; the output end of the boiler steam drum is connected to the inlet of the turbogenerator unit via a superheater; a condenser output end of the turbogenerator unit is connected to a water supply module; the water supply module comprises one water inlet pipe and two water outlet pipes, one water outlet pipe communicates with a first evacuated solar collector tube, and the second water outlet pipe communicates with a boiler water supply pipe.

In a class of this embodiment, a last solar automatic heat collecting and equalizing tube of the superheat section converges with an output of the superheater via a steam valve, and a converge pipe is connected to an inlet of the turbogenerator unit; prior to convergence, a steam switch valve and a steam flow regulator are provided on an output pipe of the superheater.

In a class of this embodiment, the water supply module comprises a deaerator and a feed water pump connected in series; a softened water tank is connected to the deaerator via the water inlet pipe; the condenser output end of the turbogenerator unit is connected to the deaerator; an outlet of the feed water pump is connected to the two water outlet pipes; each water outlet pipe is provided with a switch valve, and one water outlet pipe is provided with a feedwater control valve.

The invention further provides a power generation method using the thermal power generation system, the power generation comprising a solar-thermal complementary power generation mode in sunny days, a solar power generation mode in daytime having sufficient sunlight, and a boiler heat supply power generation mode at night or cloudy/rainy days, and the method comprising: in sunny days, introducing feedwater provided by a water supply pipe to the solar concentration and heat supply module, preheating the feedwater by solar energy in the evacuated solar collector tube of the preheating section, and then continuing heating the feedwater in the solar automatic heat collecting and equalizing tube of the steam-water two phase evaporation section whereby producing a water-steam two-phase mixing flow in the absorption tube, allowing the mixing flow to tumble spirally in the absorption tube under the action of the baffle to quickly equalize the temperature of the absorption tube, and then introducing the mixing flow to the steam-water separator and separating steam from water; returning the separated water to the steam-water two phase evaporation section for reevaporation, and transporting the separated steam to the solar automatic heat collecting and equalizing tube in the superheating section to produce superheated steam; allowing the superheated steam to tumble spirally in the absorption tube to equalize the temperature of the absorption tube, and converging the superheated steam with superheated steam from the superheater of the boiler, and transporting the mixed superheated steam to the turbogenerator unit for solar-thermal complementary power generation;

at night or cloudy/rainy days, introducing the feedwater only to a boiler heating module to produce superheated steam, and transporting the superheated steam via a superheater to the turbogenerator unit for thermal power generation. In the boiler heat supply power generation mode, the solar heating module stops working, and water in the solar automatic heat collecting and equalizing tube stop flowing and stays in the insulating state;

in daytime having sufficient sunlight, heating the feedwater by the preheating section and the two-phase evaporation section to yield the water-steam two-phase mixing flow, separating the mixing flow by the steam-water separator and further heating the separated saturated steam by the superheating section to produce superheated steam, and transporting the superheated steam to the turbogenerator unit for thermal power generation. In the solar power generation mode, the boiler needs working at night, to shorten a starting time of the boiler, only a small amount of water is fed to the boiler to ensure the boiler runs in low load (about 10%).

In a class of this embodiment, the feedwater is preheated to 90° C. in the evacuated solar collector tube of the preheating section.

In a class of this embodiment, the boiler is a coal-fired boiler, oil-fired boiler, gas-fired boiler, biomass direct combustion boiler, or, coal gas boiler, preferably, a biomass gasification gas boiler or a biomass direct combustion boiler.

In the solar trough heat collecting module, the steam-water two phase evaporation section is followed by at least one steam-water separator. The separated saturated steam can be directly transported to the turbogenerator unit for power generation, or first converges with the saturated steam produced by the boiler and then is transported to and heated by the superheater to produce superheated steam, which is transported to the turbogenerator unit for power generation. Or, the separated saturated steam is heated by the automatic heat equalizing trough type module in the superheated section, converges with the saturated steam produced by the boiler, and then is transported to the turbogenerator unit for power generation. The separated water from the steam-water separator returns to the steam-water two phase evaporation section for reevaporation via a back water pump. Different power generation modes can be started according to weather conditions, so it is energy-saving and eco-friendly.

The baffle is disposed in the inner cavity of the absorption tube of a solar automatic heat equalizing trough type module, and can drive a fluid in the absorption tube to tumble up and down alternately. Thus, the laminar state of the two phase fluid is broken, the fluid automatically moves up and down in the absorption tube to produce a self-stirring effect, thereby equalizing the heat energy of the upper and lower parts of the absorption tube, preventing the burst of the tube.

BRIEF DESCRIPTION OF THE DRAWINGS

The invention is described hereinbelow with reference to accompanying drawings.

DETAILED DESCRIPTION OF THE EMBODIMENTS

Detailed description of the invention will be given below in conjunction with accompanying drawings.

Figure 2:
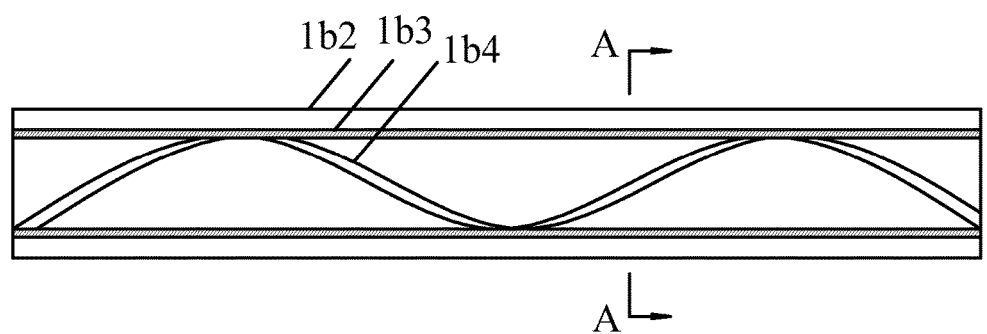
FIG. 2 is a schematic diagram of a solar automatic heat collecting and equalizing tube of a first example of the invention.

FIG. 2 is a schematic diagram of a solar automatic heat collecting and equalizing tube of a first example of the invention. In the figure, $1b2$ represents an outer glass tube of the solar automatic heat collecting and equalizing tube, and $1b3$ represents an inner absorption tube of the solar automatic heat collecting and equalizing tube ($1b3$ is made of high temperature resistant metal materials such as stainless steel, beryllium alloy (for example, beryllium bronze), and the space between the glass tube and the absorption tube is vacuum). The absorption tube is coated with a heat absorption layer. $1b4$ represents a baffle disposed in an inner cavity of the absorption tube $1b3$. $1b4$ is made of the same or similar materials as $1b3$. A-A represents a position and direction of a cross section of an automatic heat equalizing trough type module (that is, to cut the automatic heat equalizing trough type module at the A-A position and observe the cross section from the right side, then the solar automatic heat collecting and equalizing tube is shown in FIG. 4).

The baffle $1b4$ is spiral with appropriate pitches. The outer diameter of the spiral is equal to or less than the inner diameter of $1b3$, so that the baffle can be continuously arranged in the inner cavity of the absorption tube $1b3$. To ensure the uniform tumbling speed of the fluid in the absorption tube, the axial pitches of the baffle are preferably the same. Along the axial direction of the absorption tube, one end of the baffle $1b4$ is fixed on the inner cavity of the absorption tube $1b3$, and the other end of the baffle is free.

Figure 3:
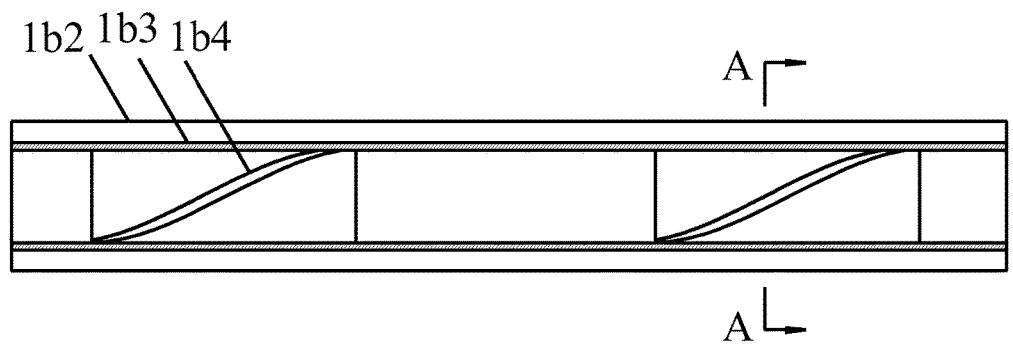
FIG. 3 is a schematic diagram of a solar automatic heat collecting and equalizing tube of a second example of the invention.

FIG. 3 is a schematic diagram of a solar automatic heat collecting and equalizing tube of a second example of the invention. In the figure, $1b2$ represents an outer glass tube of the solar automatic heat collecting and equalizing tube, and $1b3$ represents an inner absorption tube of the solar automatic heat collecting and equalizing tube ($1b3$ is made of high temperature resistant metal materials such as stainless steel, beryllium alloy (for example, beryllium bronze)), and the space between the glass tube and the absorption tube is vacuum. The absorption tube is coated with a heat absorption layer. $1b4$ represents two sections of a baffle (in fact, a plurality of sections of the baffle is also practicable) disposed in an inner cavity of the absorption tube $1b3$. The baffle $1b4$ is spiral with appropriate pitches. The outer diameter of the spiral is equal to or less than the inner diameter of $1b3$, so that the baffle can be continuously arranged in the inner cavity of the absorption tube $1b3$. To ensure the uniform tumbling speed of the fluid in the absorption tube, the axial pitches of the baffle are preferably the same. 1b4 is made of the same or similar materials as 1b3. A-A represents a position and direction of a cross section of an automatic heat equalizing trough type module (that is, to cut the automatic heat equalizing trough type module at the A-A line and observe it from the right side, then the solar automatic heat collecting and equalizing tube is shown in the center of FIG. 4). Along the axial direction of the absorption tube, one end of the baffle 1b4 is fixed on the inner cavity of the absorption tube 1b3, and the other end of the baffle is free.

Figure 4:
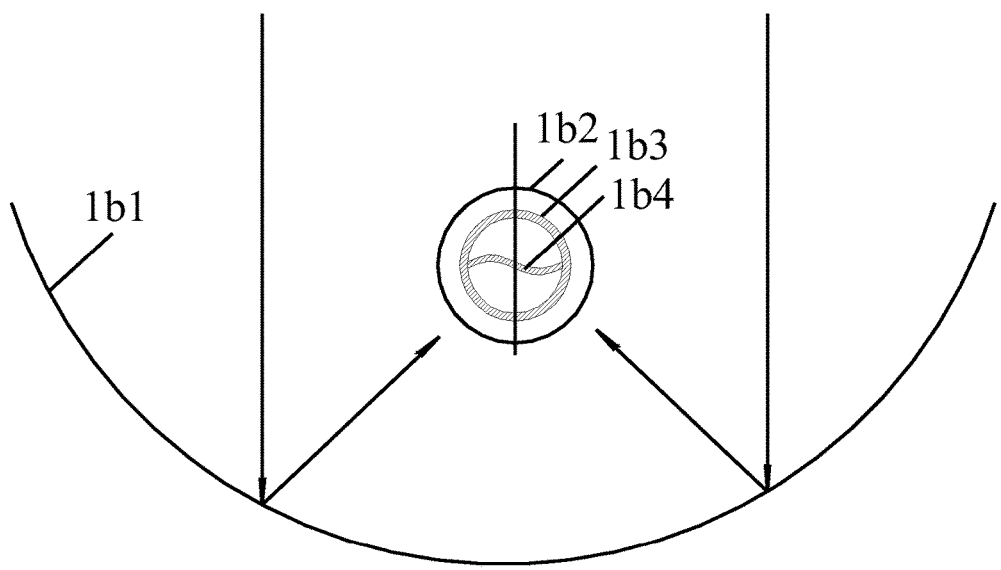
FIG. 4 is a cross sectional view of an automatic heat equalizing trough type module comprising the solar automatic heat collecting and equalizing tube in FIG. 2 or 3 (the cross sectional view of the automatic heat equalizing trough type module is taken from line A-A in FIG. 2 or 3).

FIG. 4 is a cross sectional view of an automatic heat equalizing trough type module comprising the solar automatic heat collecting and equalizing tube in FIG. 2 or 3. The cross sectional view is taken from line A-A in FIG. 2 or 3. The solar automatic heat collecting and equalizing tube is disposed at a focal point of a parabolic trough reflector. 1b1 is a parabolic trough reflector, 1b2 represents an outer glass tube of the solar automatic heat collecting and equalizing tube, and 1b3 represents an inner absorption tube of the solar automatic heat collecting and equalizing tube (1b3 is made of high temperature resistant metal materials such as stainless steel, beryllium alloy), and the space between the glass tube and the absorption tube is vacuum. The absorption tube is coated with a heat absorption layer. 1b4 represents a baffle disposed in an inner cavity of the absorption tube 1b3. 1b4 is made of the same or similar materials as 1b3. The arrows in the figure represent the optical path of sunlight, which converge on the solar automatic heat collecting and equalizing tube disposed at the focal point of a parabolic trough reflector.

Figure 5:
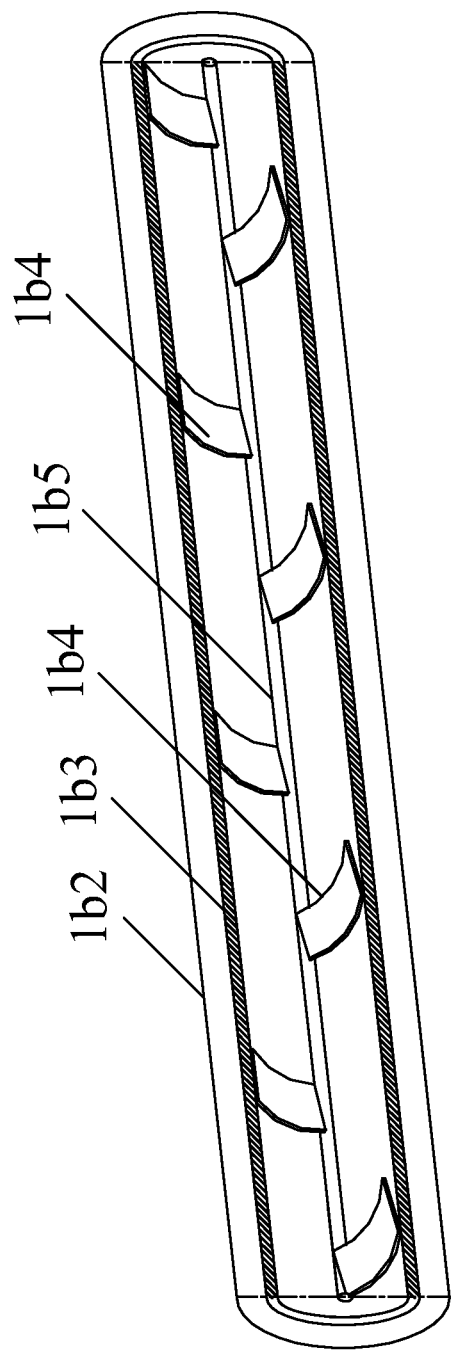
FIG. 5 is a schematic diagram of a solar automatic heat collecting and equalizing tube of a third example of the invention.

FIG. 5 is a schematic diagram of a solar automatic heat collecting and equalizing tube of a third example of the invention, which is a longitudinal section view along the central axis of the solar automatic heat collecting and equalizing tube. 1b2 represents an outer glass tube. 1b3 represents an inner absorption tube. The space between the glass tube and the absorption tube is vacuum. 1b5 represents an axle rod. 1b4 represents spiral blades fixed on the axle rod by welding or other fixed modes. The space between the blades is the same, and 2, 3, 4, or N blades are disposed in each spiral cycle. In the figure, two blades are provided in each spiral cycle. The automatic heat equalizing trough type module comprising the solar automatic heat collecting and equalizing tube has the same structure as that in FIG. 4.

Figure 1:
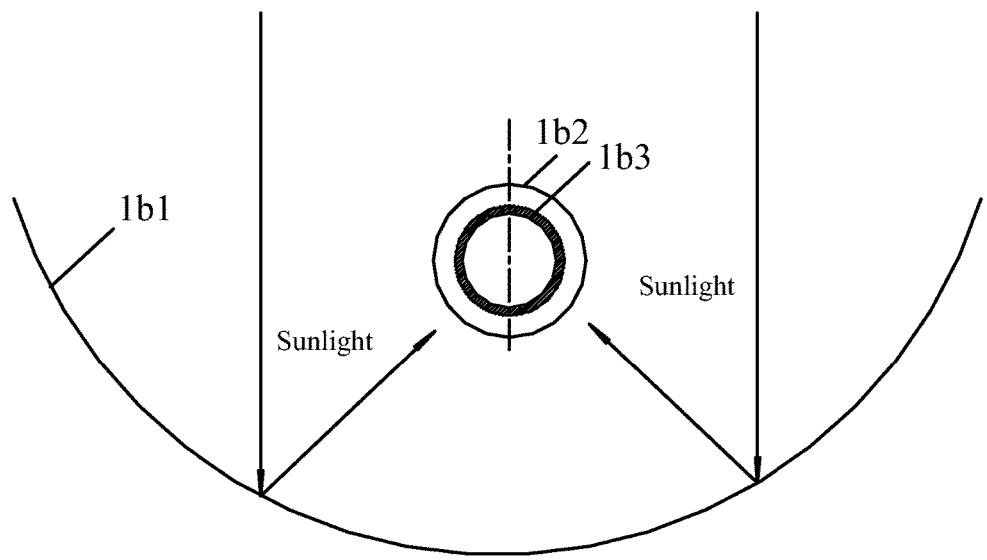
FIG. 1 is a schematic diagram of an evacuated solar collector tube module comprising evacuated solar collector tubes in the prior art.
Figure 6:
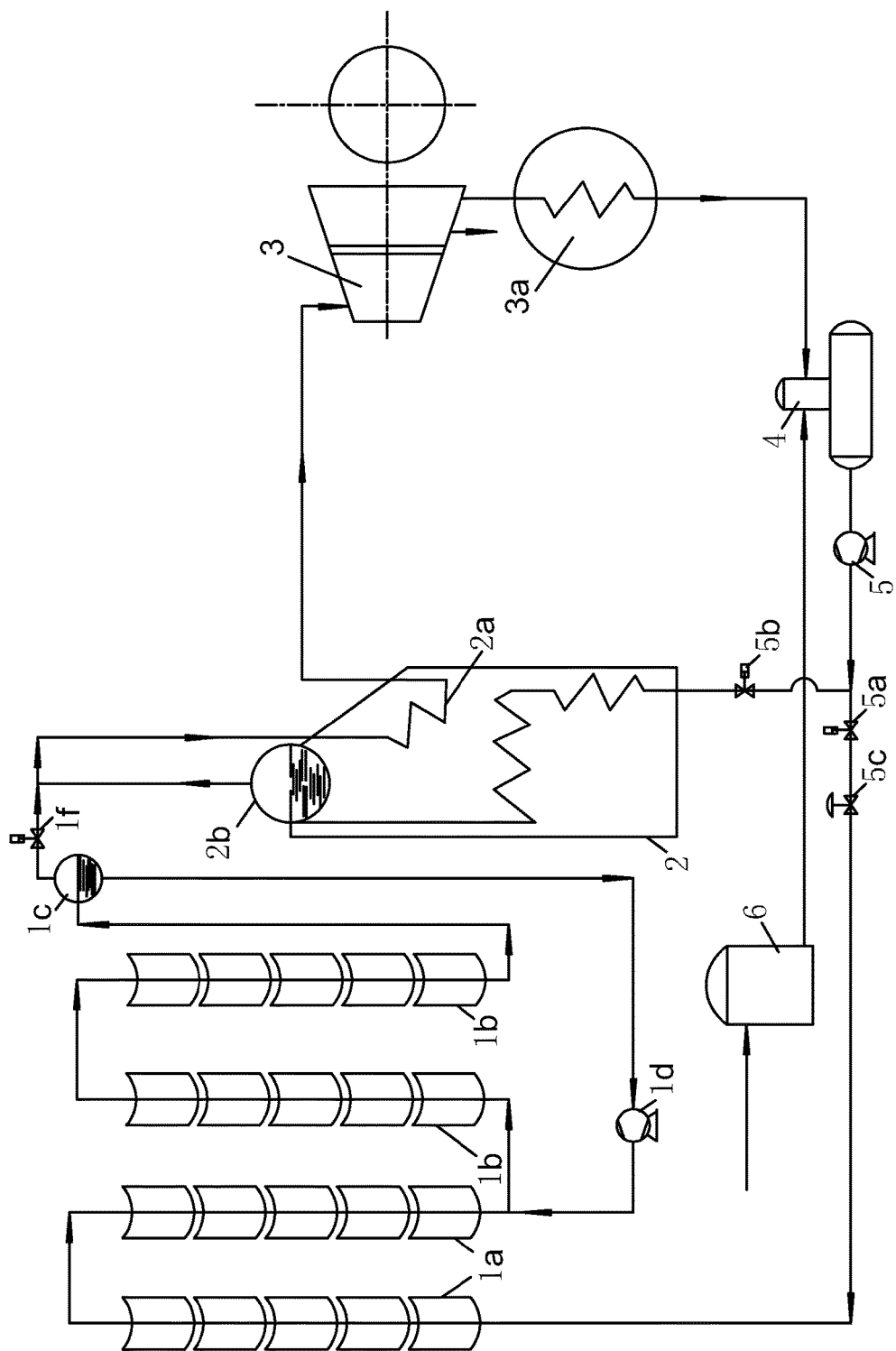
FIG. 6 is a schematic diagram of a thermal power generation system of a first example of the invention.
Figure 7:
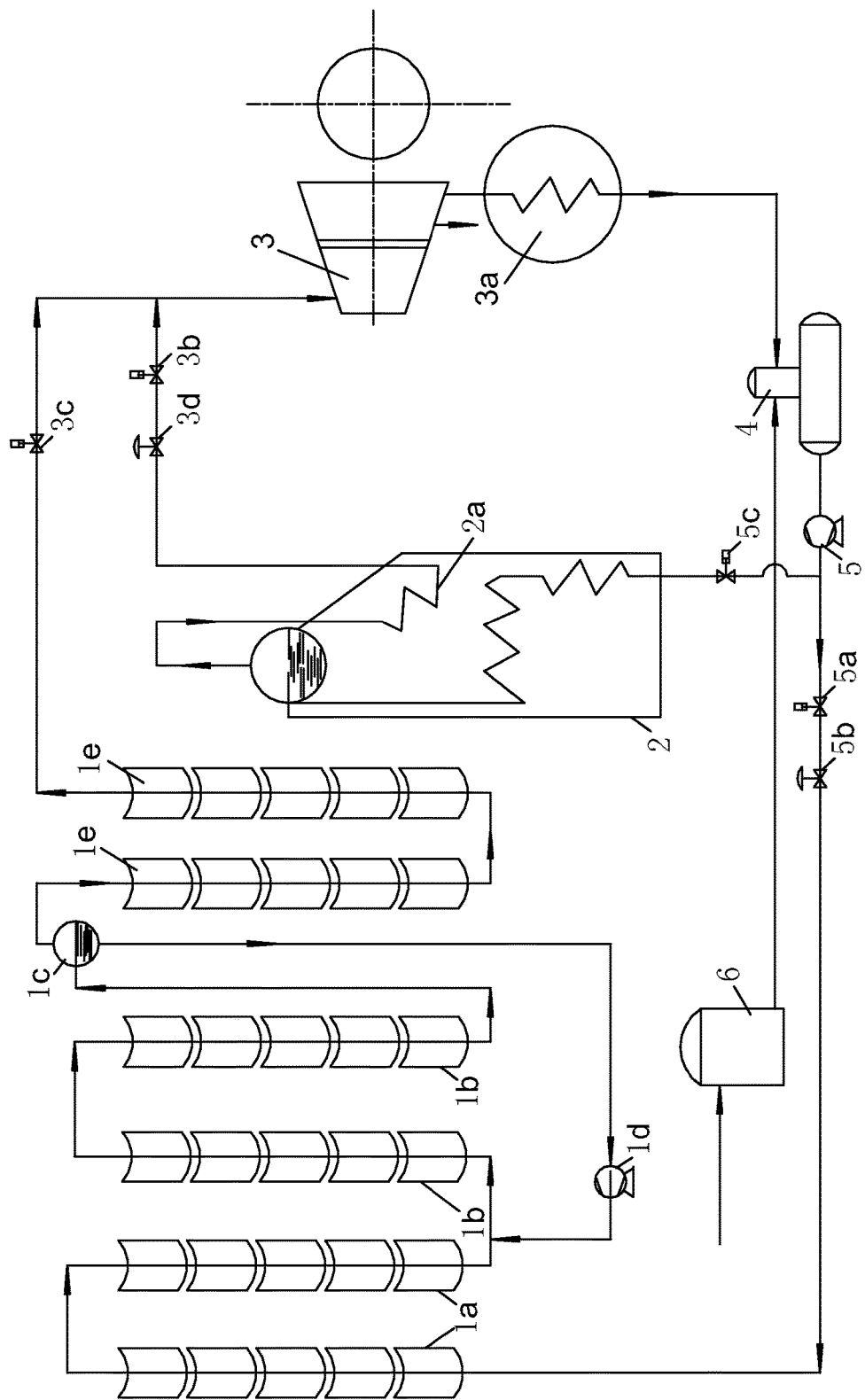
FIG. 7 is a schematic diagram of a thermal power generation system of a second example of the invention.

As shown in FIGS. 6 and 7, 1a represents a preheating section comprising a plurality of ordinary evacuated solar collector tubes (as shown in FIG. 1) connected in series. 1b represents a steam-water two phase evaporation section comprising a plurality of automatic heat equalizing trough type modules connected in series. 1c represents a steam-water separator, 1d represents a back water pump, 1e represents a superheating section comprising a plurality of automatic heat equalizing trough type modules connected in series (which is only shown in FIG. 7), and 1f represents a steam valve. 2 represents a boiler heating module (the boiler is a coal-fired boiler, oil-fired boiler, gas-fired boiler, biomass direct combustion boiler, or, coal gas boiler, preferably, a biomass gasification gas boiler or a biomass direct combustion boiler), 2a is a superheater, 2b is a boiler steam drum, 3 is a turbogenerator unit, 3a is a condenser of the turbogenerator unit, 3b and 3c are switch valves; 3d is a steam flow control valve; 4 is a deaerator, 5 is a water feed pump, 5a and 5b are switch valve, 5c is a feedwater control valve, 6 is a softened water tank (the softened water is from a chemical water treatment plant).

The power generation method of the thermal power generation system in FIG. 6 is summarized as follows.

In daytime having sufficient sunlight, the switch valves 5a, 5b and 1f are open, and the back water pump 1d is open. The water from the deaerator is driven by the feed water pump 5, most of which flows to the preheating section 1a of the evacuated solar collector tubes where the water is heated to 90° C. The water continues flowing to the steam-water two-phase evaporation section and is heated to yield a water-steam two-phase mixing flow. The mixing flow is tumbled spirally in the absorption tube under the action of the baffle and flows to the steam-water separator 1c. The separated steam converges with saturated steam from the boiler steam drum, the mixed steam is further heated in a superheater of the boiler to yield superheated steam, and the superheated steam is transported to the turbogenerator unit for solar-thermal complementary power generation. The separated water from the steam-water separator 1c returns to the steam-water two phase evaporation section 1b via the back water pump 1d for reevaporation.

Because the spiral baffle 1b4 is disposed in the inner cavity 1b3 of the absorption tube of the solar automatic heat collecting and equalizing tube, in the two-phase evaporation section, the two-phase mixing liquid is driven by the feed water pump 5 to tumble up and down alternately in the absorption tube 1b3. Water has good heat conduction properties. Although it is the lower part of the absorption tube 1b3 that absorbs the heat energy, the tumbling of the water quickly transfers the heat to the upper part of the absorption tube 1b3, so that the upper and lower parts of the absorption tube 1b3 can reach a thermal equalization shortly, thereby preventing the burst of the evacuated solar collector tube when water is directly filled with.

In cloudy/rainy days, the opening of the feedwater control valve 5c at the outlet of the water feed pump 5 is turned down, so that the water flowing to the evacuated solar collector tube is decreased, while the water flowing to the boiler via the switch valve 5b is increased. The load of the boiler is increased and more steam is produced to ensure the output power of the turbogenerator unit unchanged.

At night, the switch valves 5a and 1f are close, and the back water pump 1d is close. The water from the deaerator 4 is driven by the feed water pump 5 and totally flows to the boiler 2 whereby producing superheated steam. The superheated steam is transported to the turbogenerator unit for power generation. The evacuated solar collector tubes stop working, the medium stops flowing, and all stays in the insulating state.

The power generation method of the thermal power generation system in FIG. 7 is summarized as follows.

In daytime having sufficient sunlight, the switch valves 5a, 5b and 1f are open, and the back water pump 1d is open. The water from the deaerator is driven by the feed water pump 5, most of which flows to the preheating section 1a of the evacuated solar collector tubes where the water is heated to 90° C. The water continues flowing to the steam-water two-phase evaporation section and is heated to yield a water-steam two-phase mixing flow. The mixing flow is tumbled spirally in the absorption tube under the action of the baffle and flows to the steam-water separator 1c. The separated water from the steam-water separator 1c returns to the steam-water two phase evaporation section 1b via the back water pump 1d for reevaporation.

The separated steam from the steam-water separator 1c flows to the superheating section comprising a plurality of automatic heat equalizing trough type modules connected in series, where the steam is heated to produce superheated steam. The superheated steam converges with the superheated steam from the superheater 2a of the conventional boiler, and the mixed steam is transported to the turbogenerator unit 3 for power generation.

Because the spiral baffle 1b4 is disposed in the inner cavity 1b3 of the absorption tube of the solar automatic heat collecting and equalizing tube, in the two-phase evaporation section, the two-phase mixing liquid is driven by the feed water pump 5 to tumble up and down alternately in the absorption tube 1b3. Water has good heat conduction properties. Although it is the lower part of the absorption tube 1b3 that absorbs the heat energy, the tumbling of the water quickly transfers the heat to the upper part of the absorption tube 1b3, so that the upper and lower parts of the absorption tube 1b3 can reach a thermal equalization shortly, thereby preventing the burst of the evacuated solar collector tube when water is directly filled with.

In the superheating section 1e, the spiral baffle 1b4 is disposed in the inner cavity 1b3 of the absorption tube of the solar automatic heat collecting and equalizing tube. The superheated steam continues tumbling up and down spirally in the absorption tube 1b3. The spiral tumbling of the single fluid produces strong up-and-down stirring, although the heated steam has bad heat conductivity, the strong stirring can also quickly equalize the heat energy in the absorption tube 1b3, thereby preventing the burst of the evacuated solar collector tube.

In cloudy/rainy days, the opening of the feedwater control valve 5c at the outlet of the water feed pump 5 is turned down, so that the water flowing to the evacuated solar collector tube is decreased, while the water flowing to the boiler via the switch valve 5b is increased. The load of the boiler is increased and more steam is produced to ensure the output power of the turbogenerator unit unchanged.

At night, the switch valves 5a and 1f are close, and the back water pump 1d is close. The water from the deaerator 4 is driven by the feed water pump 5 and totally flows to the boiler 2 whereby producing superheated steam. The superheated steam is transported to the turbogenerator unit for power generation. The evacuated solar collector tubes stop working, the medium stops flowing, and all stays in the insulating state.

Advantages of the solar-thermal complementary power generation system of the invention are summarized as follows. The system comprises a preheating section and a steam-water two phase evaporation section comprising solar concentration modules (or comprising a preheating section, a steam-water two phase evaporation section and a superheated section). The steam-water two phase evaporation section and the superheated section both comprise the solar automatic heat collecting and equalizing tube and automatic heat equalizing trough type module, and at least one steam-water separator is disposed in the steam-water two phase evaporation section, thereby favoring the complementation and convergence of the steam from the solar modules and the boiler. As a result, the power plant is free of the influence of weather conditions, and can generate power even at night. Particularly, the solar automatic heat collecting and equalizing tube and the automatic heat equalizing trough type module can be directly filled with water for power generation, which is a novel technology path.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A solar-thermal complementary power generation system, comprising: a solar concentration and heat supply module, a boiler heat supply module comprising a boiler steam drum and a superheater, and a turbogenerator unit, wherein
   the solar concentration and heat supply module comprises a preheating section and a steam-water two phase evaporation section which are connected in series;
   the preheating section comprises an evacuated solar collector tube;
   the steam-water two phase evaporation section comprises an automatic heat equalizing trough type module;
   the automatic heat equalizing trough type module comprises a solar automatic heat collecting and equalizing tube and a parabolic trough reflector;
   the solar automatic heat collecting and equalizing tube comprises a glass tube, an absorption tube, and a baffle;
   the glass tube is sleeved on the absorption tube;
   the absorption tube is coated with a heat absorption layer;
   a space between the glass tube and the absorption tube is vacuum;
   the baffle is disposed in an inner cavity of the absorption tube and is configured to drive a fluid in the absorption tube to tumble up and down alternately;
   the baffle is spiral in shape and fixed in the absorption tube;
   the solar automatic heat collecting and equalizing tube is disposed at a focal point of the parabolic trough reflector;
   at least one steam-water separator is connected in series to an output tube at one end of the steam-water two phase evaporation section;
   a steam output end of the steam-water separator converges with an output end of the boiler steam drum, and converged steam is transported to the turbogenerator unit via the superheater;
   a separated water output end of the steam-water separator is connected to the solar automatic heat collecting and equalizing tube via a backflow pipe;
   a condenser output end of the turbogenerator unit is connected to a water supply module; and
   the water supply module comprises one water inlet pipe, a first water outlet pipe, and a second water outlet pipe; the first water outlet pipe communicates with the evacuated solar collector tube, and the second water outlet pipe communicates with a boiler water supply pipe.

2. The system of claim 1, wherein the steam output end of the steam-water separator converges with the output end of the boiler steam drum via a steam valve.

3. The system of claim 1, wherein
   the water supply module comprises a deaerator and a feed water pump connected in series;
   a softened water tank is connected to the deaerator via the water inlet pipe;
   the condenser output end of the turbogenerator unit is connected to the deaerator;
   an outlet of the feed water pump is connected to the first and second water outlet pipes; and
   each of the first and second water outlet pipes is provided with a switch valve, and the first water outlet pipe is provided with a feedwater control valve.

4. The system of claim 2, wherein
the water supply module comprises a deaerator and a feed water pump connected in series;
a softened water tank is connected to the deaerator via the water inlet pipe;
the condenser output end of the turbogenerator unit is connected to the deaerator;
an outlet of the feed water pump is connected to the first and second water outlet pipes; and
each of the first and second water outlet pipes is provided with a switch valve, and the first water outlet pipe is provided with a feedwater control valve.

5. A power generation method using the solar-thermal complementary power generation system of claim 1, the power generation system having a solar-thermal complementary power generation mode for use in sunny days and a boiler heat supply power generation mode for use at night or cloudy/rainy days, and the method comprising:
in sunny days, introducing feedwater provided by a water supply pipe to the solar concentration and heat supply module, preheating the feedwater by solar energy in the evacuated solar collector tube of the preheating section, and then continuing heating the feedwater in the solar automatic heat collecting and equalizing tube of the steam-water two phase evaporation section whereby producing a water-steam two-phase mixing flow in the absorption tube, allowing the mixing flow to tumble spirally in the absorption tube under the action of the baffle to quickly equalize a temperature of the absorption tube, and then introducing the mixing flow to the steam-water separator and separating steam from water; returning the water separated by the steam-water separator to the steam-water two phase evaporation section for reevaporation, and converging the steam separated by the steam-water separator with saturated steam from the boiler steam drum, heating mixed steam in a heating module of the boiler to yield superheated steam, and transporting the superheated steam to the turbogenerator unit for solar-thermal complementary power generation;
at night or cloudy/rainy days, introducing the feedwater only to a boiler heating module to produce superheated steam, and transporting the superheated steam via a superheater to the turbogenerator unit for thermal power generation; wherein in the boiler heat supply power generation mode, the solar heating module stops working, and water in the solar automatic heat collecting and equalizing tube stop flowing and stays in the insulating state.

6. The method of claim 5, wherein the feedwater is preheated to 90° C. in the evacuated solar collector tube of the preheating section.

7. The method of claim 5, wherein the steam output end of the steam-water separator converges with the output end of the boiler steam drum via a steam valve.

8. The method of claim 5, wherein
the water supply module comprises a deaerator and a feed water pump connected in series;
a softened water tank is connected to the deaerator via the water inlet pipe;
the condenser output end of the turbogenerator unit is connected to the deaerator;
an outlet of the feed water pump is connected to the first and second water outlet pipes; and
each of the first and second water outlet pipes is provided with a switch valve, and the first water outlet pipe is provided with a feedwater control valve.

9. A solar-thermal complementary power generation system, the system comprising: a solar concentration and heat supply module, a boiler heat supply module comprising a boiler steam drum and a superheater, and a turbogenerator unit, wherein
the solar concentration and heat supply module comprises a preheating section, a steam-water two phase evaporation section, and a superheat section which are connected in series;
the preheating section comprises an evacuated solar collector tube;
the steam-water two phase evaporation section and the superheat section each comprise an automatic heat equalizing trough type module;
the automatic heat equalizing trough type module comprises a solar automatic heat collecting and equalizing tube and a parabolic trough reflector;
the solar automatic heat collecting and equalizing tube comprises a glass tube, an absorption tube, and a baffle;
the glass tube is sleeved on the absorption tube;
the absorption tube is coated with a heat absorption layer;
a space between the glass tube and the absorption tube is vacuum;
the baffle is disposed in an inner cavity of the absorption tube and is configured to drive a fluid in the absorption tube to tumble up and down alternately;
the baffle is spiral in shape and fixed in the absorption tube;
the solar automatic heat collecting and equalizing tube is disposed at a focal point of the parabolic trough reflector;
at least one steam-water separator is connected in series to an output tube at one end of the steam-water two phase evaporation section;
a steam output end of the steam-water separator is connected to the solar automatic heat collecting and equalizing tube of the superheat section, and the solar automatic heat collecting and equalizing tube of the superheat section is connected to an inlet of the turbogenerator unit;
a separated water output end of the steam-water separator is connected to the solar automatic heat collecting and equalizing tube of the automatic heat equalizing trough type module via a backflow pipe;
the output end of the boiler steam drum is connected to the inlet of the turbogenerator unit via the superheater;
a condenser output end of the turbogenerator unit is connected to a water supply module; and
the water supply module comprises one water inlet pipe, a first water outlet pipe, and a second water outlet pipe; the first water outlet pipe communicates with the evacuated solar collector tube, and the second water outlet pipe communicates with a boiler water supply pipe.

10. The system of claim 9, wherein
the solar automatic heat collecting and equalizing tube of the superheat section converges with an output of the superheater via a steam valve, and a converge pipe is connected to an inlet of the turbogenerator unit; and
prior to convergence, a steam switch valve and a steam flow regulator are provided on an output pipe of the superheater.

11. The system of claim 9, wherein
the water supply module comprises a deaerator and a feed water pump connected in series;
a softened water tank is connected to the deaerator via the water inlet pipe;

the condenser output end of the turbogenerator unit is connected to the deaerator;

an outlet of the feed water pump is connected to the first and second water outlet pipes; and each of the first and second water outlet pipes is provided with a switch valve, and the first water outlet pipe is provided with a feedwater control valve.

12. The system of claim 10, wherein the water supply module comprises a deaerator and a feed water pump connected in series;

a softened water tank is connected to the deaerator via the water inlet pipe;

the condenser output end of the turbogenerator unit is connected to the deaerator;

an outlet of the feed water pump is connected to the first and second water outlet pipes; and each of the first and second water outlet pipes is provided with a switch valve, and the first water outlet pipe is provided with a feedwater control valve.

13. A power generation method using the solar-thermal complementary power generation system of claim 9, the power generation system having a solar-thermal complementary power generation mode for use in sunny days, a solar power generation mode for use in daytime having sufficient sunlight, and a boiler heat supply power generation mode for use at night or cloudy/rainy days, and the method comprising:

in sunny days, introducing feedwater provided by a water supply pipe to the solar concentration and heat supply module, preheating the feedwater by solar energy in the evacuated solar collector tube of the preheating section, and then continuing heating the feedwater in the solar automatic heat collecting and equalizing tube of the steam-water two phase evaporation section whereby producing a water-steam two-phase mixing flow in the absorption tube, allowing the mixing flow to tumble spirally in the absorption tube under the action of the baffle to quickly equalize a temperature of the absorption tube, and then introducing the mixing flow to the steam-water separator and separating steam from water; returning the water separated by the steam-water separator to the steam-water two phase evaporation section for reevaporation, and transporting the steam separated by the steam-water separator to the solar automatic heat collecting and equalizing tube in the superheating section to produce superheated steam; allowing the superheated steam to tumble spirally in the absorption tube to equalize a temperature of the absorption tube, and converging the superheated steam with superheated steam from the superheater of the boiler, and transporting the mixed superheated steam to the turbogenerator unit for solar-thermal complementary power generation;

at night or cloudy/rainy days, introducing the feedwater only to a boiler heating module to produce superheated steam, and transporting the superheated steam via a superheater to the turbogenerator unit for thermal power generation; wherein in the boiler heat supply power generation mode, the solar heating module stops working, and water in the solar automatic heat collecting and equalizing tube stop flowing and stays in the insulating state;

in daytime having sufficient sunlight, heating the feedwater by the preheating section and the two-phase evaporation section to yield the water-steam two-phase mixing flow, separating the mixing flow by the steam-water separator and further heating the separated saturated steam by the superheating section to produce superheated steam, and transporting the superheated steam to the turbogenerator unit for thermal power generation; wherein in the solar power generation mode, the boiler needs working at night, to shorten a starting time of the boiler, only a small amount of water is fed to the boiler to ensure the boiler runs in low load.

14. The method of claim 13, wherein the feedwater is preheated to 90° C. in the evacuated solar collector tube of the preheating section.

15. The method of claim 13, wherein the steam output end of the steam-water separator converges with an output end of the boiler steam drum via a steam valve.

16. The method of claim 13, wherein the water supply module comprises a deaerator and a feed water pump connected in series;

a softened water tank is connected to the deaerator via the water inlet pipe;

the condenser output end of the turbogenerator unit is connected to the deaerator;

an outlet of the feed water pump is connected to the first and second water outlet pipes; and each of the first and second water outlet pipes is provided with a switch valve, and the first water outlet pipe is provided with a feedwater control valve.

* * * * *